Oct. 18, 1927.

H. M. CAMERON

SCALE

Filed March 26, 1926

Hugh M. Cameron
INVENTOR.

By G. Willard Rich
ATTORNEY.

Oct. 18, 1927.

H. M. CAMERON

SCALE 1,646,009

Filed March 26, 1926

Hugh M. Cameron
INVENTOR.

BY G. Willard Rich
ATTORNEY.

Patented Oct. 18, 1927.

1,646,009

UNITED STATES PATENT OFFICE.

HUGH M. CAMERON, OF NEW YORK, N. Y., ASSIGNOR OF ONE-HALF TO EDWARD A. JUDGE, OF BROOKLYN, NEW YORK.

SCALE.

Application filed March 26, 1926. Serial No. 97,531.

This invention relates to scales and has particular application to that type of scale which is especially suited for weighing persons and for use in bathrooms and bedrooms, in which the dimensions are such that the scale may be removed from view, for example by placing it beneath the bed or bathtub or other article of furniture.

A further object of the invention is the provision of a scale of the type above referred to in which the indicating dial or device is positioned within, more or less centrally and longitudinally of the platform so that the indicator may be easily viewed by a person standing thereon, particularly when the scale is placed adjacent a wall, the indicator being arranged to rotate in the line of vision of the person being weighed.

Another object is the provision of levers directly counterbalanced by a single compensating spring.

Another object is the provision of a system which will cause equal distribution of the weight imposed upon the platform to each of the corners thereof and the concentration of the equally distributed weight at a point central of said platform, whereby shearing stresses and unequal strains are obviated.

Briefly, these objects are accomplished by an arrangement of parts in which the indicator is placed more or less centrally and longitudinally and within the platform, disposing the compensating spring centrally of said platform and connecting the power ends of oppositely and centrally disposed levers to one end of said spring, there being between the levers and the indicator actuating mechanism for rotating the indicator.

Referring to the accompanying drawings, which illustrate an embodiment of my invention:

Throughout the drawings like reference numerals indicate like parts.

Figure 1:
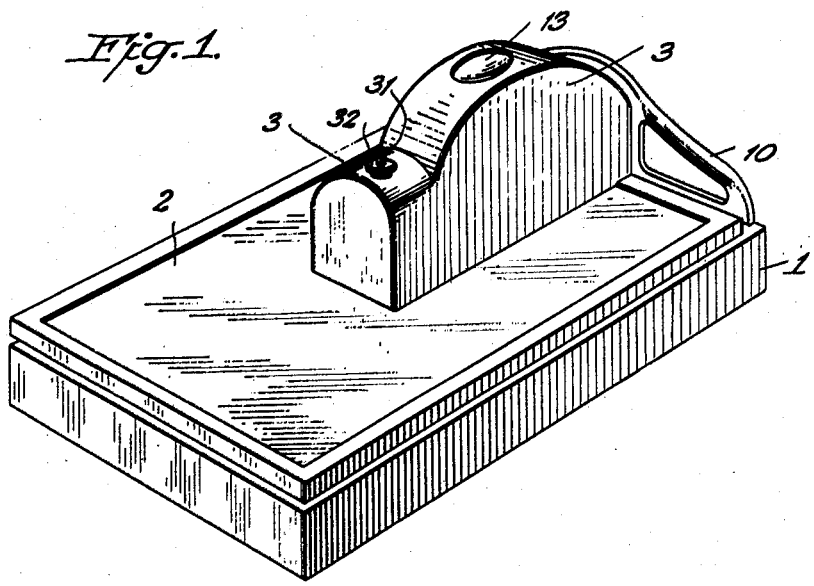
Fig. 1 is a perspective view of the scale.

The scale herein illustrated comprises a shallow base 1, a platform 2, a casing 3, and the operating mechanism.

The inside corners of the base 1 are provided with slotted lugs 4 and shoulders 5. The lugs 4 have grooves in their faces transversely of the slots into which pins 6 are caused to rest. The shoulders 5 are provided with notched supports 7 on which rest the knife-edged ends 8 of the front cross-member 9. Handles 10 are cast preferably integral with the base for convenience in transporting the scale.

The platform is provided with projections or short legs 11, the bottoms of which are conically recessed so as to rest at one point centrally thereof on pointed conical studs 12.

The casing 3 is made purposely narrow and positioned centrally and longitudinally of the platform so that the feet of a person being weighed may be placed at either side of the casing and thus necessitating his standing in a convenient position to observe the indicator. This location of the dial or indicator is further advantageous in that it facilitates a simple arrangement of the other parts of the mechanism whereby the expense of the construction of the scale as a whole may be lessened.

In order to enlarge the numerals and so make them more easily decipherable, the aperture in the casing through which the indicator is observed is provided with a magnifying glass 13.

The operating mechanism comprises a forwardly extending lever arm 14 and a rearwardly extending lever arm 15 which are depressed toward their power ends P and P' when a weight is placed upon the platform. The lever arms are rigidly mounted at their fulcrum ends F and F' upon the rockers (hereafter indicated) or cross-members 9.

As stated above, the front cross-member is carried by notched supports and is capable of oscillating, as is also the cross-member in the rear. A tilting of the cross-members is effected by depressing the platform which causes extensions 16, upon which the feet of the platform rest, to be similarly depressed. These extensions are cast preferably integrally with collars 17 which are rigidly mounted upon the cross-members. It will be obvious that depression of the extensions causes the cross-members to be rotated and thus in turn depress the lever arms. The fulcrum ends of the lever arms are preferably cast integrally with collars 17ª which are rigidly mounted on said cross-members. The collars 17 are provided with set screws 18 which are adjusted to prevent their lateral displacement.

The power end of the lever 14 is attached to the end of the spiral spring 19 and the power end of the lever 15 is connected by a yoke 19ª to the power end of the lever 14 adjacent to and in vertical alignment with said first-mentioned spring connection.

Since depression of the extensions 16, due to rotation of the cross-members 9, must necessarily increase the longitudinal distance between opposite extensions, the platform would have a tendency to become unseated and cause damage to the scale. In order to avoid such a possibility the rear cross-member is supported at its ends by rockers 20 suspended from the pins 6. The rockers permit the cross-member to move toward and from the front cross-member, or, what is the same thing, permits the distance between opposite extensions to remain contant. The rockers are provided however to take care of any undue depression of the extensions, since there is sufficient movement of the pointed conical studs 12 within the conical depressions in the legs 11 to compensate for any ordinary depression of the extensions.

Figure 2:
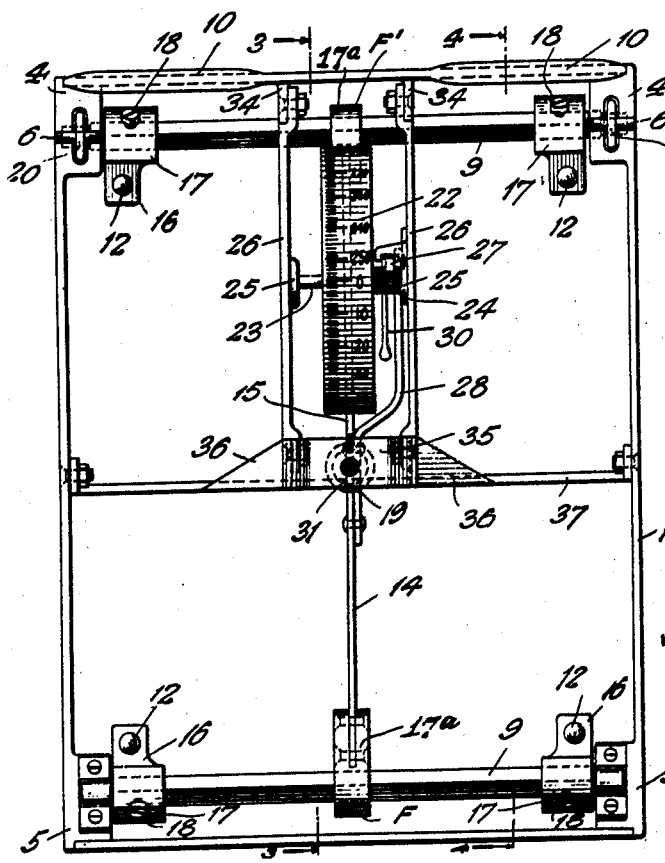
Fig. 2 is a plan view of the scale with the platform removed.
Figure 3:
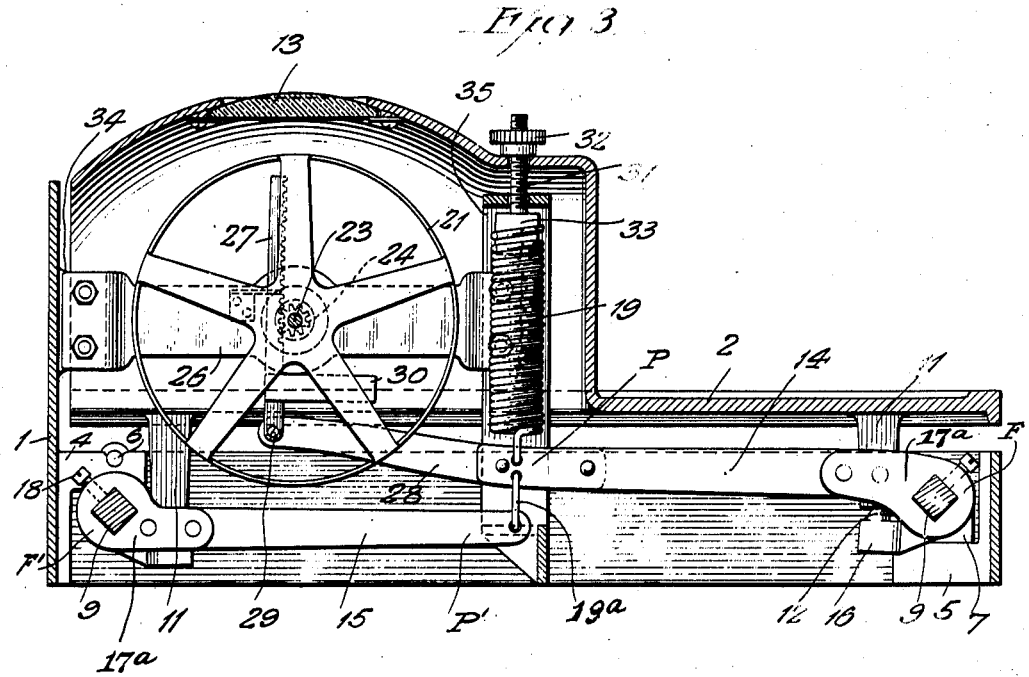
Fig. 3 is a cross-sectional view on the line 3×—3× of Fig. 2.
Figure 4:
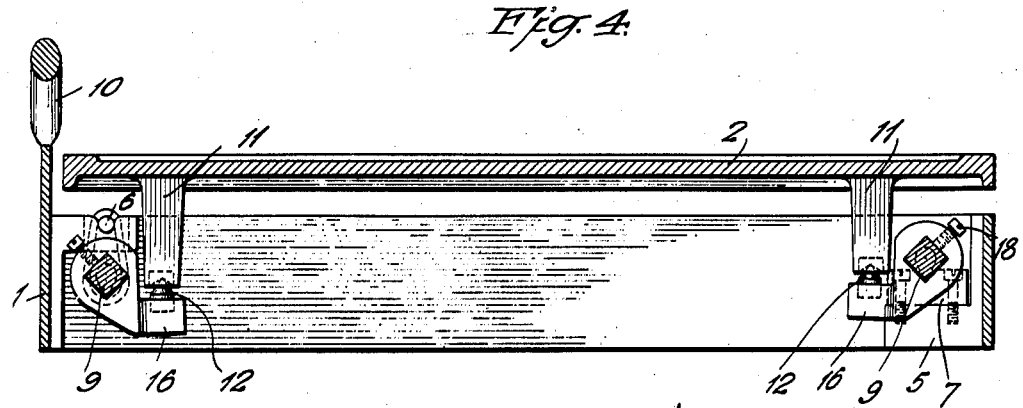
Fig. 4 is a cross-sectional view on the line 4×—4× of Fig. 2.

The indicator member is shown as comprising a wheel 21 upon the circumference of which is placed a calibrated scale 22. The wheel is mounted on a shaft 23 upon which shaft is also mounted a pinion wheel 24. The shaft is journaled in bearings 25 set in beams 26 which support the wheels 21 and 24 and the said shaft. A rack 27, meshing with the pinion wheel is lowered and raised by the movement of the lever arms 14 and 15, it being pivoted as indicated at 29 to the extending end 28 of the lever arm 14. A weight 30 is attached to the rack 27 and extends to the right and beyond the center line of said rack (Fig. 2) for the purpose of holding it in contact with the pinion with equal pressure at all positions.

The tension of the spring 19 may be increased or decreased by turning the screw 31 which is provided with a knurled cap 32 for convenience in turning the screw. The end of the screw rests upon a block 33 in which the upper end of the spring is fixed. Turning the screw causes the block to be depressed or permits it to rise, and thus increase or decrease the tension of the spring.

For convenience in adjusting the tension of this spring, part of the screw and the knurled cap is exposed outside of the casing 3.

The beams 26, comprising the frame on the base which rises above the platform within the housing thereon, are screwed at one end of their ends to lugs 34 formed at points intermediate the handles 10, and at their other ends to the sides of an arch 35. The arch is supported at its lower ends by shelves 36 and a cross-piece 37. The top of the arch is apertured to permit the screw 31 to project beyond the casing.

The invention resides not only in the novel and ingenious arrangement of the various parts, but in the mechanical balance of the operating mechanism, which is so essential to the efficiency of a machine of this type.

It will be understood that various modifications may be made in the structural details of the device without departing from the principles of the invention set forth in the annexed claims.

What I claim is:

1. In a scale, the combination with a base, of a pair of counterbalanced opposed levers mounted thereon, a plaftorm carried by said levers, and a rotatable indicating device located within the area of the platform and actuated by said levers.

2. A scale comprising a shallow base member, a pair of counterbalanced opposed levers of the second class, connected at their free ends, each of said levers carrying a fixed pivot, a platform supported on the fixed pivots, and a compensating resistance attached directly to the levers at their point of connection.

3. A scale comprising base and platform members, a pair of counterbalanced levers of the second class centrally located therein and supporting the platform, each having a fulcrum pivot, antifriction bearings mounted on the base for said fulcrum pivots, the bearings for one lever being fixed and the other movable, an indicating device disposed within the area of the platform and at one end thereof, and actuating mechanism between the levers and the indicating device.

4. A scale having a platform of greater length than width, a longitudinal housing extending upwardly from the platform at one end of the center, a movable indicating device within the housing, a base having bearings for the indicating device, movable counterbalanced levers on the base supporting the platform and operating mechanisms between the levers and indicating device.

5. A platform scale comprising a platform having a slot, of a base beneath the platform having supports extending upwardly through said slot, counterbalanced levers on the base yieldingly supporting the platform, an indicating member carried on said supports and actuating connections between the levers and indicating member.

6. A platform scale comprising a platform having a slot, of a base beneath the platform having supports extending upwardly through said slot, levers pivoted on the base and carrying the platform, a spring for counterbalancing the levers attached to said support on the base and extending through the slot in the platform, an indicating device also carried by said support, and actuating connections between the levers and indicating device.

7. In a scale, the combination with a platform having a slot, a base extending beneath the platform, and a frame work on the base extending upwardly through said slot, of a system of levers on the base supporting the platform for vertical movement, a counterbalancing spring attached to and extending upwardly from the levers and supported by said frame work, a rotatable indicator pivoted on the latter and actuating connections between it and said levers.

8. In a scale, the combination with a platform having a longitudinally upwardly extending centrally disposed housing, a base and a lever system thereon supporting the platform, of a frame work on the base extending into the housing, a compensating spring attached to the frame work and the lever system, a wheel journaled on the frame work bearing graduations, and means operated by the lever system for rotating the wheel.

9. A scale comprising a base, a platform, and a counterbalanced leverage system co-operating with said platform to transmit a weight imposed upon said platform to a single point central of said leverage system, a compensating resistance connected directly to the levers at said point and an indicating device actuated by said system.

10. A scale comprising a base, a platform, a leverage system and a compensating spring, wherein the compensating spring is located at the center of the leverage system and connected to the free ends of the levers, said levers being of equal length.

This specification signed this twenty-third day of March, 1926.

HUGH M. CAMERON.

DISCLAIMER 1,646,009.—*Hugh M. Cameron*, New York, N. Y. SCALE. Patent dated October 18, 1927. Disclaimer filed February 25, 1943, by the assignee, *Continental Scale Corporation*.

Hereby enters this disclaimer to claims 1, 3, 4, 5, 6, 7, and 8 in said specification.

[*Official Gazette March 23, 1943.*]